United States Patent [19]
Beat

[11] Patent Number: 6,052,806
[45] Date of Patent: *Apr. 18, 2000

[54] METHOD AND APPARATUS FOR TESTING AN INTEGRATED CIRCUIT DEVICE

[75] Inventor: Robert Beat, Bristol, United Kingdom

[73] Assignee: STMicroelectronics Limited, Bristol, United Kingdom

[ * ] Notice: This patent issued on a continued prosecution application filed under 37 CFR 1.53(d), and is subject to the twenty year patent term provisions of 35 U.S.C. 154(a)(2).

[21] Appl. No.: 08/519,192

[22] Filed: Aug. 25, 1995

[30] Foreign Application Priority Data

Aug. 26, 1994 [GB] United Kingdom ................ 94 17 297

[51] Int. Cl.$^7$ .................................................. G01R 31/28
[52] U.S. Cl. ........................................ 714/718; 365/201
[58] Field of Search .................................. 371/21.1, 22.5, 371/22.3, 27, 21.2; 365/201, 200; 395/375, 500, 183.06, 183.18, 182.03; 714/5, 8, 25, 30, 43, 718, 733, 742

[56] References Cited

U.S. PATENT DOCUMENTS

| | | | |
|---|---|---|---|
| 3,343,141 | 9/1967 | Hackl | 340/172.5 |
| 3,519,808 | 7/1970 | Lawder | 235/153 |
| 3,961,251 | 6/1976 | Hurley et al. | 324/73 AT |
| 3,961,254 | 6/1976 | Cavaliere et al. | 324/73 AT |
| 4,167,780 | 9/1979 | Hayashi | 364/200 |
| 4,481,627 | 11/1984 | Beauchesne et al. | 371/21 |
| 4,527,234 | 7/1985 | Bellay | 364/200 |
| 4,575,792 | 3/1986 | Keeley | 364/200 |
| 4,888,772 | 12/1989 | Tanigawa | 371/21.2 |
| 4,912,395 | 3/1990 | Sato et al. | 571/21.2 |
| 5,369,646 | 11/1994 | Shikatani | 371/22.5 |
| 5,410,544 | 4/1995 | Kreifels et al. | 371/18 |
| 5,440,516 | 8/1995 | Slemmer | 365/201 |
| 5,459,733 | 10/1995 | Alapat | 371/21.1 |
| 5,467,468 | 11/1995 | Koshikawa | 371/22.3 |
| 5,475,692 | 12/1995 | Hatano et al. | 371/21.2 |
| 5,509,134 | 4/1996 | Fandrich et al. | 395/430 |
| 5,577,050 | 11/1996 | Bair et al. | 371/10.2 |
| 5,623,620 | 4/1997 | Fandrich et al. | 395/412 |
| 5,627,838 | 5/1997 | Lin et al. | 371/21.1 |
| 5,651,128 | 7/1997 | Gaultier | 395/430 |

FOREIGN PATENT DOCUMENTS

| | | | |
|---|---|---|---|
| 63-295979 | 12/1988 | Japan | G01R 31/28 |
| 1-239485 | 9/1989 | Japan | G01R 31/28 |
| 3-239974 | 10/1991 | Japan | G01R 31/28 |
| 3-248068 | 11/1991 | Japan | G01R 31/28 |
| 4-125477 | 4/1992 | Japan | G01R 31/28 |
| 6-043221 | 2/1994 | Japan | G01R 31/28 |

*Primary Examiner*—Robert W. Beausoliel, Jr.
*Assistant Examiner*—Nadeem Iqbal
*Attorney, Agent, or Firm*—Theodore E. Galanthay; David V. Carlson; Seed and Berry LLP

[57] ABSTRACT

An integrated circuit device includes operational circuitry, for example, in the form of a memory for carrying out operations of the integrated circuit device. Additionally, at least one peripheral circuit is connected to the operational circuitry for carrying out at least one function in respect of the operational circuitry. Input means are provided to permit the input of command data in a normal mode of operation and to permit the input of test data in a test mode of operation. Control circuitry has an input to receive command data from the input means. The control circuitry is arranged to generate, in response to the command data, control signals to control at least one of the peripheral circuits in the normal mode of operation. A control bus is connected between the control circuitry and the peripheral circuits and is arranged to carry control signals from the control circuitry to at least one peripheral circuit. Test circuitry is also provided which has an input arranged to receive test data from the input means. The test circuitry also has an output connected to the control bus and is arranged such that in the test mode of operation, the test data is supplied to at least one peripheral circuit from the test circuitry via the control bus.

45 Claims, 8 Drawing Sheets

METHOD AND APPARATUS FOR TESTING AN INTEGRATED CIRCUIT DEVICE

FIELD OF INVENTION

The present invention relates to a method and apparatus for testing an integrated circuit device, for example a memory device such as a flash EPROM, EEPROM, or non-volatile memory or similar device.

BACKGROUND OF INVENTION

In memory devices, control circuitry is used to interpret user commands and activate relevant peripheral circuits which perform, in respect of the memory, the user commands. Usually a single user command requires a defined sequence of events to be performed. The control circuitry acts as a state machine to provide a coded signal or state for each stage of the sequence of events. A state machine provides a set of states and a set of transition rules for moving between those states at clock edges. In order to activate the relevant peripheral circuits, the control circuitry has to send the coded signals to these circuits. A control bus can be thus provided which is routed throughout the memory device. Each peripheral device is provided with a decoder which activates the respective peripheral circuit when a valid state from the bus is decoded.

If a chip malfunctions, it is desirable to know whether the malfunction is caused by a fault in the control circuitry or in one of the peripheral circuits. Some known arrangements incorporate dedicated local test circuitry which can be activated by a tester. Each peripheral circuit would be provided with its own test circuitry to test whether or not the peripheral circuit is functioning correctly. Circuitry is also provided to connect test inputs of the circuit to the test circuitry of each peripheral circuit. This considerably increases the amount of circuitry required which is undesirable.

As an alternative solution, the controlling input of the peripheral circuit to be tested can be probed by a microprober which forces that input to an active state. In this way, it can be seen whether or not the peripheral circuit is functioning correctly. However, this solution is only really feasible if the controlling input of the circuit to be tested is readily accessible. Often the inputs of such circuits are not readily accessible and thus the peripheral circuit cannot be readily tested. It can also be difficult to force the voltage with a microprober even if the input is accessible. This is a consequence of the smaller geometries present on modem integrated circuits.

SUMMARY OF INVENTION

Accordingly, it is an object of embodiments of the invention to provide a method and apparatus which allows various peripheral circuits of an integrated circuit device to be more reliably and easily tested.

According to a first aspect of the present invention, there is provided an integrated circuit device which includes operational circuitry for carrying out operations of the integrated circuit device. At least one peripheral circuit is connected to the operational circuitry for carrying out at least one function in respect of the operational circuitry. Input means permits the input of command data in a normal mode of operation and permits the input of test data in a test mode of operation. Control circuitry has an input to receive command data from the input means and is arranged to generate, in response to the command data, control signals to control the at least one peripheral circuit in the normal mode of operation. A control bus is connected between the control circuitry and the at least one peripheral circuit and is arranged to carry the control signals from the control circuitry to the at least one peripheral circuit. Test circuitry has an input arranged to receive test data from the input means and has an output connected to the control bus and is connected so that in the test mode of operation the test data is supplied to the at least one peripheral circuit from said test circuitry.

This device uses the bus circuitry which is required during normal operation to provide the test path. In this way the amount of test circuitry required can be reduced as compared to known arrangements, as dedicated test circuitry for each peripheral circuit is not required. Furthermore the device permits each peripheral circuit to be easily tested via the input of the test circuitry which may be easily accessible. The test mode may be used to determine malfunctions in the device and/or to determine how the device responds to given control signals. For example, the test mode can be used to characterize the device by verifying the correct operation of the device as well as its exact performance.

Additionally, as the input means is used to input test data and command data, the number of inputs required can be minimized. This may be of advantage with certain integrated circuit devices. The tester is able to select the test data to be input. This may have advantages over arrangements where test data is generated by testing circuitry of the device in that the tester can select those tests which are most appropriate given the previous operation of the device.

Preferably, the test circuitry includes storage circuitry arranged to store the test data. This storage circuitry may include latch circuitry. In this way, test data can be stored while it is being driven onto the control bus. This is of particular advantage in embodiments of the invention which have an input/output device and the command data and test data are input via the input/output device. As the test data is stored in storage circuitry, the input/output device is then free to be used to provide an output from the device which may contain an indication as to whether a peripheral circuit has been correctly activated in response to test data. Furthermore, by using the same input/output device to provide the command data and test signal data, no special test data input for the device is required.

The test data input to the test circuitry may emulate control signals generated by the control circuitry in response to command data. In this way, the peripheral circuit being tested can be activated or attempted to be activated. If a peripheral circuit fails to be activated in the correct manner in response to the test data, it can be determined that the peripheral circuit in question is the cause of a malfunction.

The output of the control circuitry which includes switching circuitry may be operable to selectively connect one of the control circuitry and the test circuitry to the control bus, whereby in normal operation only control circuitry is connected to the control bus and in a test mode only the test circuitry is connected to the control bus. The switching circuitry may be in the form of multiplexing circuitry which enables either the test data or the control signals to be driven onto the bus circuitry, depending on the mode of operation of the device.

Preferably, the control circuitry comprises a clock signal source which generates clock signals for use in both in the normal operating mode and the test modes of the device. Preferably, the clock signal source has a user clock input and a test mode signal input which has a first form when the device is in normal operation and a second different form where the device is in a test mode. The clock signals generated by the clock signal source preferably controls the switching circuitry.

At least one of the command data and the test data may be input in parallel at the input means. Preferably both the command data and the test data are input in parallel. This may allow faster and more efficient operation of the device to be achieved.

Preferably, the response of a peripheral device to be tested to the test data is ascertained by determining the effect of the function carried out by the peripheral circuit to be tested on the operational circuitry. Thus, additional test outputs may not be required in that the response of the peripheral circuit being tested to test data is ascertained by its effect on the operational circuitry. The same outputs which are provided in the normal mode of operation can also be provided in the test mode of operation.

Preferably, the device is a memory device and that memory device is a flash EPROM although the present invention is applicable to any integrated circuit device.

According to a second aspect of the present invention there is provided a method of testing a peripheral circuit of an integrated circuit device, the peripheral circuit being connected to operational circuitry, the peripheral circuit also being connected to control circuitry by a control bus, the control circuitry being operable, in response to command signals input via input means of the integrated circuit device, to generate signals for activating the peripheral circuit in a normal mode of operation in which the peripheral circuit is operable to carry out a function in respect of the operational circuitry, the integrated circuit device further including test circuitry, in which the method includes the following steps:

a test mode signal is input to enable the test circuitry in a test mode;

test data is input via the input means to the test circuitry; and the test data is driven onto the control bus, to thereby apply the test data to the peripheral circuit to be tested.

BRIEF DESCRIPTION OF DRAWINGS

Embodiments of the present invention will now be described with reference to the accompanying drawings in which.

DESCRIPTION OF PREFERRED EMBODIMENT

While the present invention is applicable to any integrated circuit, an embodiment of the invention will be described in relation to a memory device and in particular will be described in relation to a flash memory.

Figure 1:
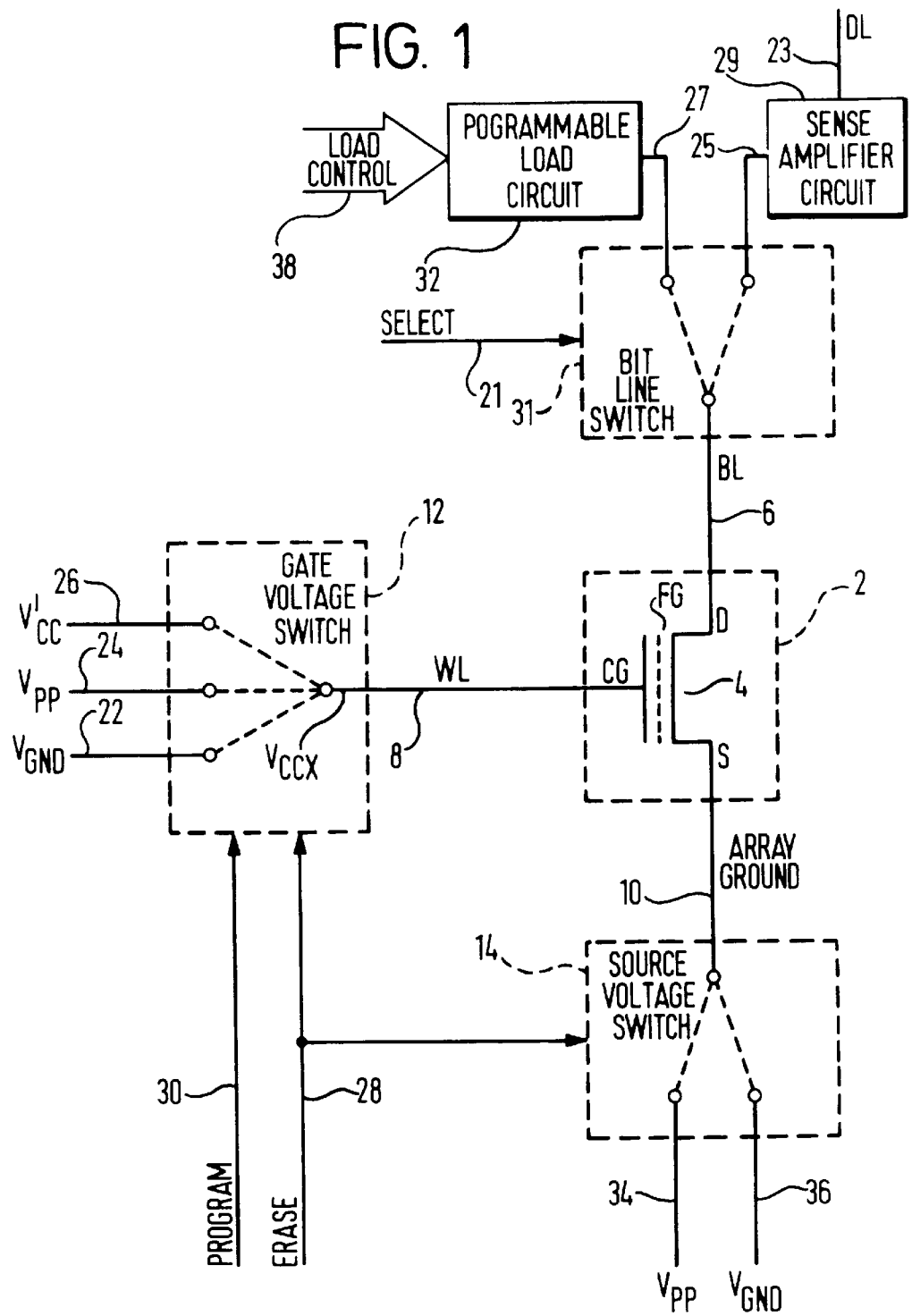
FIG. 1 is a schematic diagram of a flash memory cell.
Figure 2:
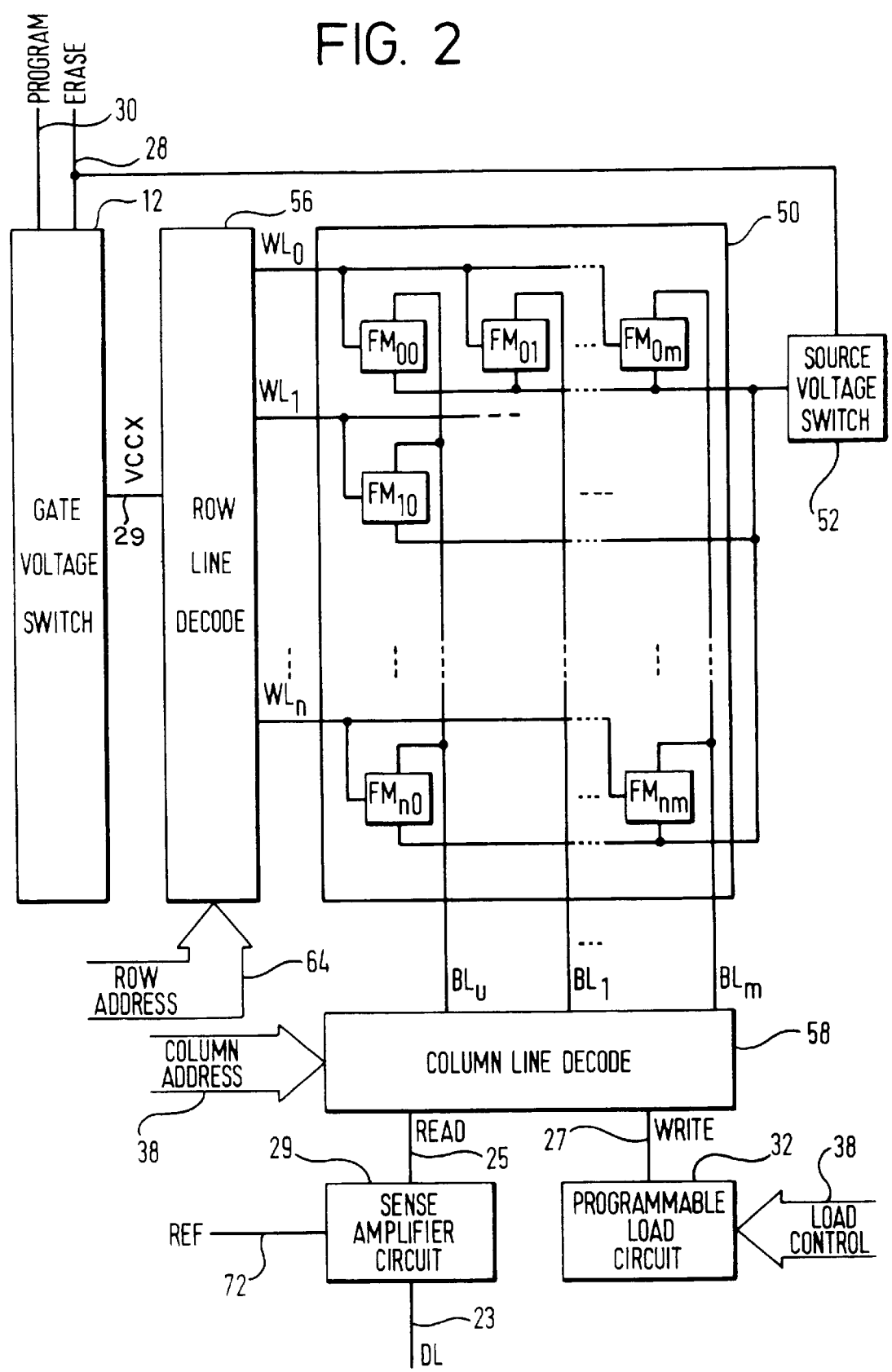
FIG. 2 is a schematic diagram of a flash memory array.

Reference will first be made to FIGS. 1 and 2 to describe the basic construction and operation of a flash memory.

FIG. 1 illustrates a flash memory cell 2 comprising a single floating gate transistor 4 having a control gate CG, a floating gate FG, a source S, and a drain D. The source S of the floating gate transistor 4 is connected to an ARRAY GROUND signal on line 10. Through a source voltage switch circuit 14 this line 10 can be at a ground voltage VGND or a high voltage Vpp. Voltage Vpp represents a programming potential (typically 12 V) and voltage VGND represents device ground. Vpp is normally connected to array ground via a resistor (not shown). The source voltage switch 14 is connected to the voltage Vpp via line 34 and the voltage VGND via line 36. The control gate CG of the floating gate transistor 4 is connected to a gate voltage switch 12 by a word line (WL) 8. The gate voltage switch 12 is further connected to voltages V'cc, Vpp and VGND on lines 26, 24 and 22 respectively. V'cc is at 5 V for a 5 V part or is boosted to about 5 V for a 3 V part. Switches 14 and 12 each receive a control signal ERASE on line 28 and additionally the gate voltage switch 12 receives a control signal PROGRAM on line 30. The drain D of the floating gate transistor 4 is connected to a bit line switch 31 by a bit line (BL) 6. The bit line switch 31 is further connected to the input of a programmable load circuit 32 on line 27 and the input of a sense amplifier circuit 29 on line 25. The output of the sense amplifier circuit 29 on line 23 forms a data line (DL). The bit line switch 31 receives a control signal SELECT on line 21. The programmable load circuit 32 receives load control signals on lines 38.

The flash memory has three modes of operation: program, erase and read. Each of these modes will be described hereinafter with reference to FIG. 1. The program mode involves writing a "0" to a memory cell or group of memory cells, the erase mode involves removing a "0" from any cell that has a "0" stored in it such that the cells all effectively store "1"s, and the read mode involves reading a cell to establish whether it is programmed or erased, i.e. contains either a "0" or a "1".

During a program mode, the control signal PROGRAM on line 30 is set such that the gate voltage switch 12 is configured to connect the voltage Vpp on line 24 to the control gate CG of transistor 4 via word line 8. As the control signal ERASE on line 28 is not set the source voltage switch 14 is configured to connect the voltage VGND on line 36 to the source of transistor 4 via the ARRAY GROUND signal line 10. The control signal SELECT on line 21 is set such that the bit line on line 6 is connected to the programmable load 32 by line 27. The load control signals 38 are set such that the programmable load 32 is controlled such that a voltage of about 5 V is on the drain D of the transistor 4 via the bit line 6. As a result of these signals applied to the transistor 4 the floating gate FG becomes negatively charged. The negative charge shifts the threshold voltage of the floating gate transistor making it less conductive. The amount of negative charge accumulated at the floating gate depends on the duration for which the control signal PROGRAM is set. In this way, a "0" is written into the cell 2. Normally, several program pulses are needed, each pulse being followed by a verify cycle.

During an erase mode, the control signal ERASE on line 28 is set such that the gate voltage switch 12 is configured to connect the voltage VGND on line 22 to the control gate CG of the transistor 4 via the word line 8, and such that the switch 14 is configured to connect the voltage Vpp on line 34 to the source S of the transistor 4 via the ARRAY GROUND signal line 10. The control signal SELECT on line 21 is again set such that the bit line 6 is disconnected so that it floats at a voltage of just under 1 V. As the floating gate transistor 4 is fabricated such that the source region in the substrate underlies the floating gate FG, any negative charge on the floating gate FG will be reduced. The amount of negative charge removed from the floating gate FG depends on the duration for which the ERASE signal on line 28 is set. The reduction of negative charge shifts the threshold voltage of the floating gate transistor 4 making it more conductive. In this way the state of the cell 2 is restored to "1". Normally, several erase pulses are required, each erase pulse being followed by a verify cycle.

During a read mode, neither the control signal ERASE on line 28 nor the control signal PROGRAM on line 30 are set. Consequently, the V'cc signal on line 26 is connected by the gate voltage switch 12 to the control gate CG of the transistor 4 via the word line 8 and the voltage VGND on line 36 is connected to the source S of the transistor 4 via the ARRAY GROUND signal line 10. The bit line 6 is biased to approximately 1 volt prior to a read operation by a bit line load (not shown) within the sense amplifying circuit 29. During a read operation, for an erased cell (with "1" stored in it) the conductivity of the cell 2 is such that current passes through the cell 2 when the bit line 6 is connected for sensing. For a programmed cell (with a "0" stored in it) substantially no current is passed by the cell 2. The current drawn (or not drawn) by the cell 2 is compared with a reference current to detect the status of the cell 2.

The operation of a flash cell in a memory array will now be described with reference to FIG. 2. Signal lines or circuitry common to FIG. 1 can be identified in FIG. 2 by use of the same reference numerals. Voltage supplies have not been illustrated in FIG. 2 for reasons of clarity, but it will be understood with reference to FIG. 1 which voltages are required in various parts of the circuit.

FIG. 2 illustrates a flash memory array 50 comprising a plurality of flash memory cells FMoo . . . FMnm, arranged in rows and columns, each of which can be the same as the cell 2 shown in FIG. 1. The gates of the transistors in each memory cell in a row are commonly connected to a respective word line WLo . . . WLn addressable by a row line decode circuit 56 which receives the row address 64. The gate voltage switch 12 responds to the control signals PROGRAM and ERASE on line 30 and 28 respectively, and supplies the appropriate gate voltage Vccx on line 29 to be switched to the addressed wordline through the row line decode circuit 56.

The drains of each transistor in a column are commonly connected by bit lines BLo . . . BLm to a column line decode circuit 58. The column line decode circuit 58 can be considered as a plurality m of the bit line switch circuits 31, with the SELECT signal being generated responsive to the column address 38. The output of the column line decode circuit 58 on line 25 is a read output and is connected to the sense amplifier circuit 29. The sense amplifier circuit 29 contains sense amplifiers (not shown) and bit line load circuits (not shown). The column line decode circuit 58 receives a write input on line 27 from the programmable load circuit 32. The programmable load circuit is controlled by the load control signals 38. During a program or erase operation the bit lines BLo to BLm are selectively connected to the programmable load circuit 32. During a read operation the selected bit line (or bit lines) is connected to a sense amplifier in the sense amplifier circuit 29. The sense amplifier circuit 29 also receives a reference signal REF on line 72 and generates an output signal on the data line (DL) on line 23.

It will be appreciated that when a particular cell is chosen to be programmed, the programming load will only be applied to a selected column so that other cells in the same row as the selected cell are not inadvertently programmed. In addition, in general, during read and program operations it is desirable to apply certain signals to cells in the array which have not been selected to improve the performance of the cell, as is well known in the art. During an erase operation every cell in the memory array is erased, although it will be appreciated by a person skilled in the art that an array could be split into sectors for erasing so that only part of the array is erased at any one time.

Figure 3:
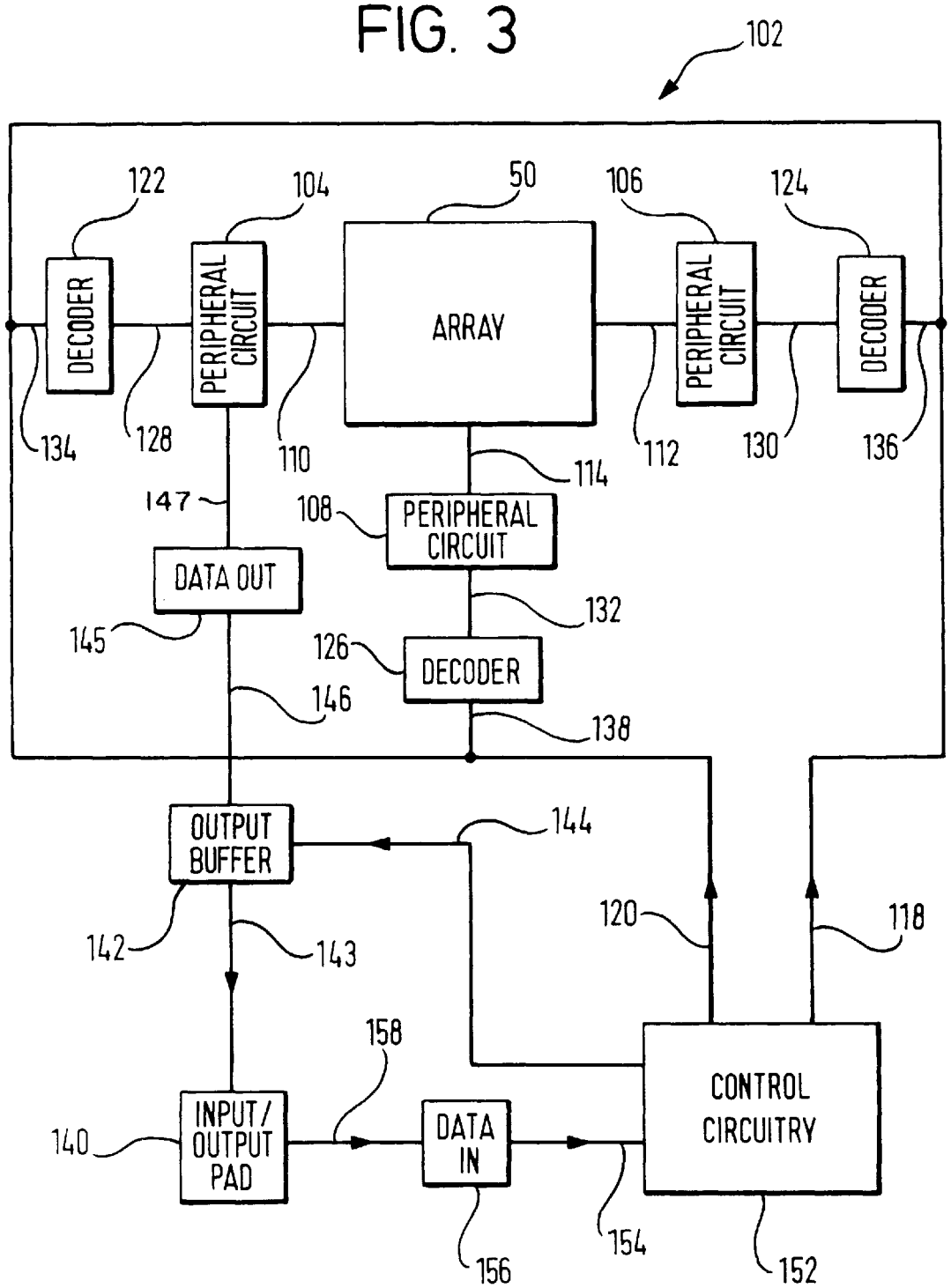
FIG. 3 is a schematic diagram of a flash EPROM circuit.

Reference will next be made to FIG. 3 which shows a schematic view of a flash EPROM 102 chip. The memory used in FIG. 3 may be of the same type as that of FIGS. 1 and 2 and, where appropriate, the same reference numerals will be used. The flash EPROM circuit 102 has an array 50 of programmable single transistor cells (not shown) connected to peripheral circuits 104, 106 and 108 via lines 110, 112 and 114 respectively. These circuits 104, 106 and 108 allow the array to be read, programmed, and erased. These peripheral circuits 104, 106 and 108 are only shown schematically and could, for example, correspond to the sense amplifier circuit 29, the programmable load circuit 32 and the gate switching circuit 12 of FIG. 2.

The flash EPROM circuit 102 also has control circuitry 152. Control circuitry 152 acts as a state machine and provides control signals which determine which of the peripheral circuits 104, 106 and 108 are activated and what function they carry out. Signals from the control circuitry 152 are provided on control buses 118 and 120. The signals on buses 118 and 120 are identical but are driven in opposite directions around the flash EPROM circuit 102. This is to ensure that each peripheral circuit receives the control signals.

The flash EPROM circuit 102 also has decoders 122, 124 and 126 which are connected to peripheral circuits 104, 106 and 108, respectively, via lines 128, 130 and 132, respectively. The decoders 122, 124 and 126 receive at their inputs 134, 136 and 138, respectively, the signals carried by buses 118 and 120 and decode these signals. If a decoded signal represents a valid function, the respective decoder outputs a signal via line 128, 130 or 132 to instruct the respective peripheral circuit 104, 106 or 108 to carry out the function defined by that particular coded signal which, for example, allows the array 50 to be read, programmed, or erased.

The control circuitry 152 in turn responds to input command data generated by, for example, a user via an input/output pad 140. The input/output pad 140 is connected to control circuitry 152 on line 154 via a data in circuit 156. The command data is interpreted by the control circuitry 152 which acts as a state machine to provide a sequence of coded signals which represent the steps which need to be carried out to implement the command data. The coded signals are output on buses 118 and 120 and conveyed to the respective peripheral circuits to allow the user command to be carried out.

The flash EPROM circuit 102 also has an output buffer 142, the output of which is connected by line 143 to the input/output pad 140. The output buffer 142 also has a first input connected via line 144 to the control circuitry 152 and a second input connected to a data out circuit 145 via line 146. The input of the data out circuit 145 is connected via line 147 to peripheral circuit 104 which may be, for example, a sense amplifier circuit. The sense amplifier circuit 104, when the flash memory 102 is in a read mode, is able to read the value stored in a selected cell and this read value can be output to the input/output pad 140 via the data out circuit 145 and output buffer 142.

Figure 4:
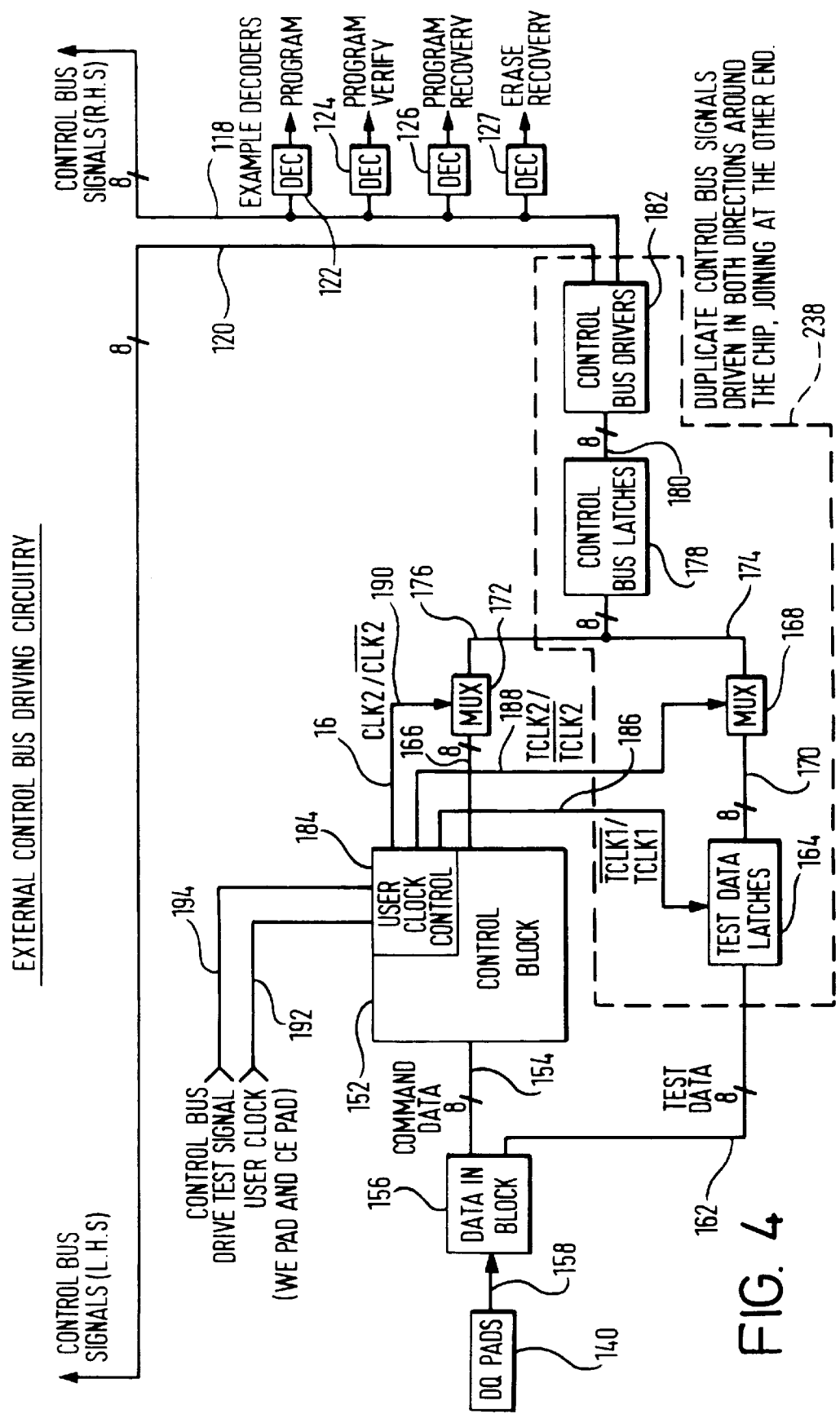
FIG. 4 is a schematic diagram of bus control circuitry, embodying the present invention.

FIG. 4 shows the additional components which are included to implement the present invention. The control circuitry 152 is arranged, when in normal operation and not in a test mode, to receive the command data on input 154 from the data in circuit 156. The data in circuit 156 itself receives an input 158 from the input/output pad 140. In normal operation the input 158 represents command data and when this command data is received by the control circuitry 152, it acts as a state machine to generate a sequence of coded states which represents a sequence of steps which need to be implemented by the peripheral circuits in order to carry out the input command. The command data is input in parallel but may in some embodiments be input serially. It will be appreciated that lines 154 and 158 actually comprise eight parallel lines forming an 8-bit path.

The data in circuit 156 has a second output 162 which is used during a test mode. Output 162 also has eight parallel lines forming an eight bit path. In this test mode the input provided at input/output pad 140 is a stream of test data which emulates a sequence of codes or states that would be generated by the control circuitry 152 during normal operation. The same input is thus used for both test and command data. The stream of test data consists of 8 bit codes fed into the data in circuit 156 in parallel. It would of course also be possible, in some embodiments, to input the data serially. The data may in some cases be a single code which is to be loaded onto the control bus to activate a peripheral circuit to be tested. That test data is output via path 162 to test data latches 164 which store the test data. The test data latches 164 are provided so that once the test data is input, the input/output device 140 can be used to provide an output. For example to test that a programming or erasing peripheral circuit has been correctly activated by test data, the value in a cell may be read and this read data can be output via the data out circuit 145 and output buffer 142 to the input/output device 140 to be checked by the tester.

The output 170 of the test data latches 164 is connected to a test multiplexer 168. Likewise the output 166 of the control circuitry 152 is connected to a control multiplexer 172. The respective outputs 174 and 176 of the test and control multiplexers 168 and 172 are connected to an input to control bus latches 178. The respective outputs 170 from the test data latches 164 and from the test and control multiplexers 168 and 178 all comprise eight lines connected in parallel to form respective 8 bit paths. The control bus latches 178 consecutively hold the coded states representing a sequence of events which need to be carried out to perform a particular command. These states can either be input test data itself input by a user or the codes generated by the control circuitry 152 in response to command data.

The output 180, which is in the form of an 8 bit path, of the control bus latches 178 is connected to control bus drivers 182 which drive the sequence of consecutive coded states around the two buses 118 and 120. The control buses 118 and 120 are connected to respective decoders 122, 124, 126 and a further decoder 127 for various peripheral circuits not shown in FIG. 4.

The control circuitry 152 has circuitry 184 for producing clock signals. The clock control circuitry 184 has an output 186 to the test data latches 164, an output 188 to the test multiplexer 168 and an output 190 to the control multiplexer 172. The clock control circuitry 184 has a master input 192 from a user clock 192 and a control bus drive test signal input 194. The clock control circuitry 184 will be described in more detail with reference to FIG. 5.

Figure 5:
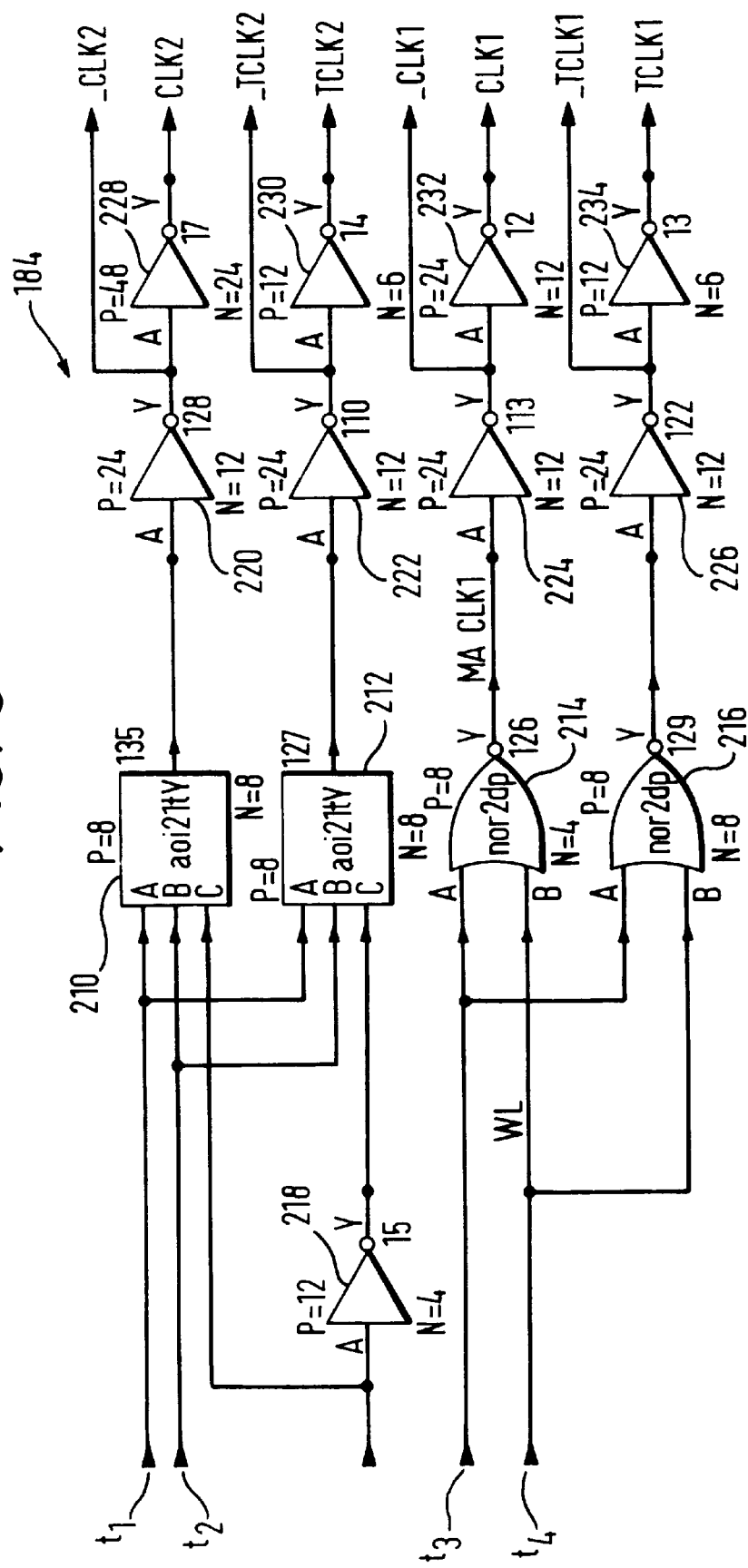
FIG. 5 is a circuit diagram of control clock circuitry of FIG. 4.

FIG. 5 shows in more detail the clock control circuitry 184 of FIG. 4. The clock control circuitry 184 has first and second complex gates 210 and 212 respectively and first and second NOR gates 214 and 216.

Figure 8:
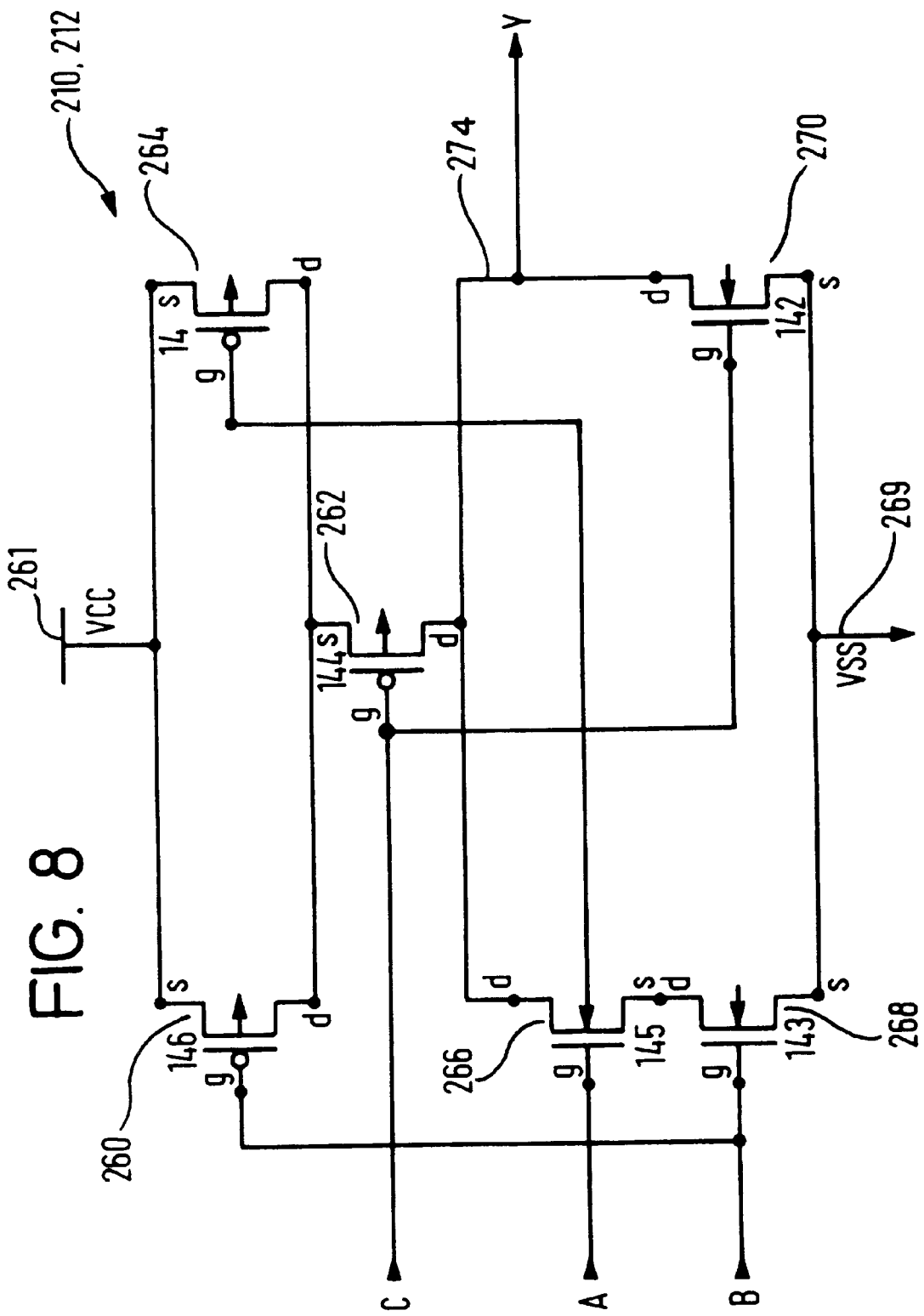
FIG. 8 shows the construction of a complex gate of FIG. 5.

The first complex gate 210, which is illustrated in more detail in FIG. 8 is arranged to carry out the following Boolean function:

$$Y = \overline{(C + (A \cdot B))}$$

where A, B and C are inputs to the gate and Y is its output.
· represents an AND function
+ represents an OR function
− represents a NOT function
The truth table for this function is given below in Table A:

TABLE A

| A | B | C | Y |
|---|---|---|---|
| 0 | 0 | 0 | 1 |
| 0 | 0 | 1 | 0 |
| 0 | 1 | 0 | 1 |
| 0 | 1 | 1 | 0 |
| 1 | 0 | 0 | 1 |
| 1 | 0 | 1 | 0 |
| 1 | 1 | 0 | 0 |
| 1 | 1 | 1 | 0 |

The first complex gate 210 receives a first clock signal t1 at its input A and a second clock signal t2 at input B. Both the first clock signal t1 and the second clock signal t2, are derived from the master user clock input 192 but are delayed with respect to one another. Input C is provided by the test mode signal CBUS_DRV which is low in normal operation of the circuit 102, and becomes high during a test mode.

The second complex gate 212 has the same construction as the first complex gate 210 and receives clock signal t1 at input A and clock signal t2 at input B. At input C it receives the inverse of the test mode signal CBUS_DRV. In particular, the test mode signal CBUS_DRV is input into an inverter 218, the output Y of which is connected to input C of the second complex gate 212.

The first NOR gate 214 has a clock signal t3 at input A and a clock signal t4 at input B. The second NOR gate 216, like the first NOR gate 214, has clock signal $t_3$ at input A and clock signal $t_4$ at input B. Clock signals t3 and t4, like clock signals t1 and t2 are derived from the master user clock input 192 and all four clocks signals t1–t4 are delayed with respect to one another. This can be seen from FIG. 6 which clearly shows that clock signals $t_1$–$t_4$ all have the same general form but are delayed with respect to each other.

The output Y of each of gates 210–216 is connected to a respective inverter 220–224. The output of the first inverter 220 provides clock signal $\overline{CLK2}$. The output of inverter 220 is also connected to a further first inverter 228, the output of which provides a clock signal CLK2. Clock signal $\overline{CLK2}$ is the inverse of clock signal CLK2.

The output of the second inverter 222 provides a clock signal $\overline{TCLK2}$, and is also connected to the input of a further second inverter 230 which provides clock signal TCLK2. Clock signal $\overline{TCLK2}$ is the inverse of clock signal TCLK2.

In a similar manner the output of the third inverter 224 provides a clock signal $\overline{CLK1}$ and is also connected to the input of a further third inverter 232, the output of which provides a clock signal CLK1, the inverse of clock signal $\overline{\text{CLK1}}$. Finally the fourth inverter 226 and a further fourth inverter 234 provide a pair of inverse clock signals $\overline{\text{TCLK1}}$ and TCLK1 in the same manner as the previous pairs of inverters.

Figure 6:
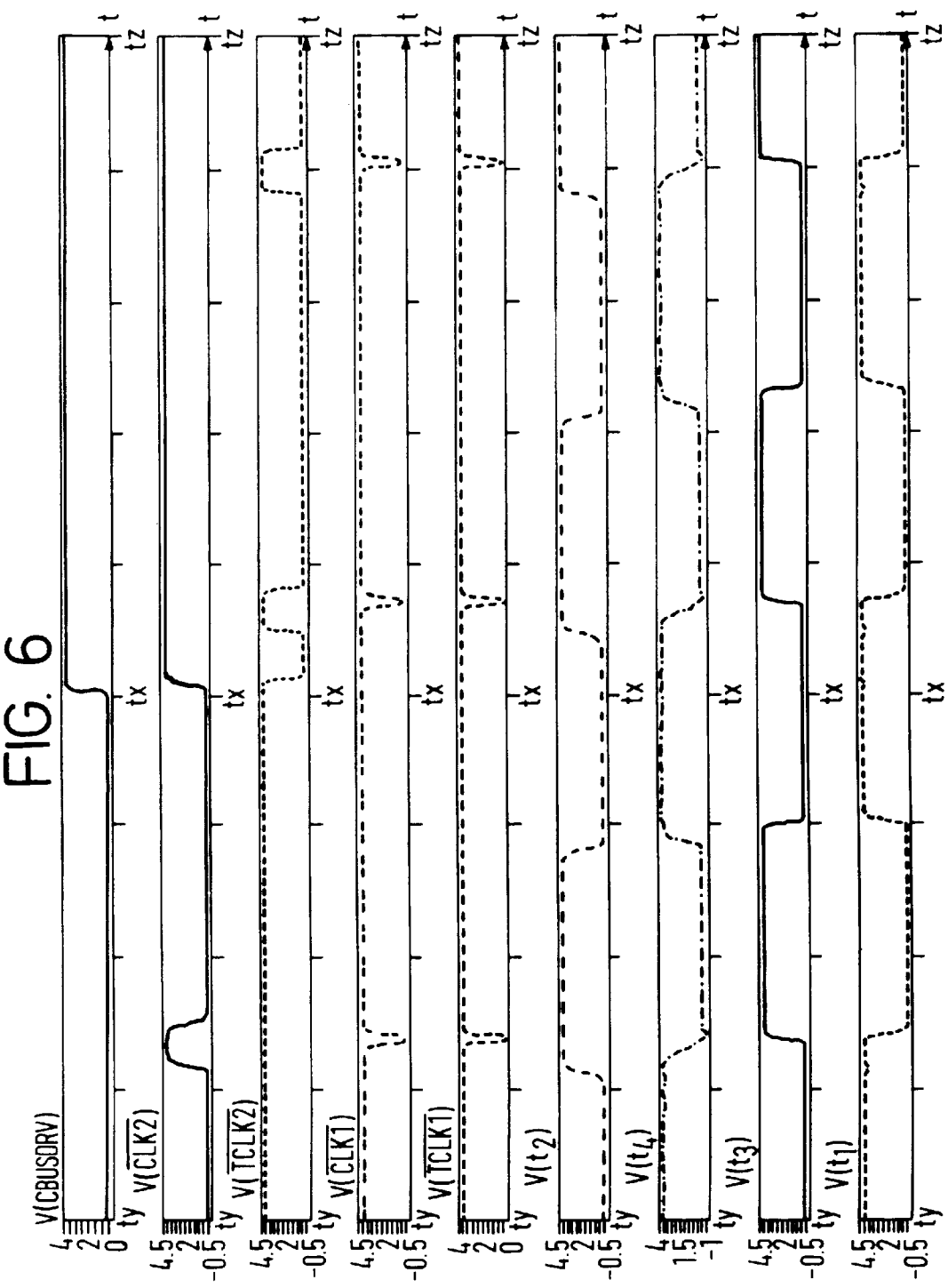
FIG. 6 illustrates the relationship between the following timing signals: CBUS_DRV, $\overline{\text{CLK2}}$, TCLK2, $\overline{\text{CLK1}}$, $\overline{\text{TCLK1}}$, t2, t4, t3, and t1 respectively.

The relationship between the various clock signals can be seen from FIG. 6. For clarity, clock signals CLK1, CLK2, TCLK1 and TCLK2 are not shown but it will be appreciated that these clock signals are the inverse of the clock signal, $\overline{\text{CLK1}}$, $\overline{\text{CLK2}}$, $\overline{\text{TCLK1}}$ and $\overline{\text{TCLK2}}$ respectively. In a normal mode of operation, that is in the period between ty and tx, the CBUS_DRV signal is low. Accordingly the test clock signal TCLK2 and its inverse are deactivated and clock signal CLK2 and its inverse are active. In a test mode, that is in the time period between tx and tz, the CBUS_DRV signal is now high. The test clock signal $\overline{\text{TCLK2}}$ and its inverse are active and clock signal $\overline{\text{CLK2}}$ and its inverse deactivated. CLK1, $\overline{\text{CLK1}}$, TCLK1 and $\overline{\text{TCLK1}}$ remain active during both the normal and the test modes of operation. Thus clock signals CLK1, $\overline{\text{CLK1}}$, CLK2 and $\overline{\text{CLK2}}$ are used to control the operation of the control circuitry 152 and the control multiplexer 172 while test clock signals TCLK1, $\overline{\text{TCLK1}}$, TCLK2 and $\overline{\text{TCLK2}}$ are used to control the test data latches 164 and the test multiplexer 168. More particularly the activation and deactivation of the control multiplexer 172 is controlled by the clock signals CLK2 and $\overline{\text{CLK2}}$. Likewise the activation and deactivation of the test multiplexer 168 is controlled by the clock signals TCLK2 and $\overline{\text{TCLK2}}$.

Figure 7:
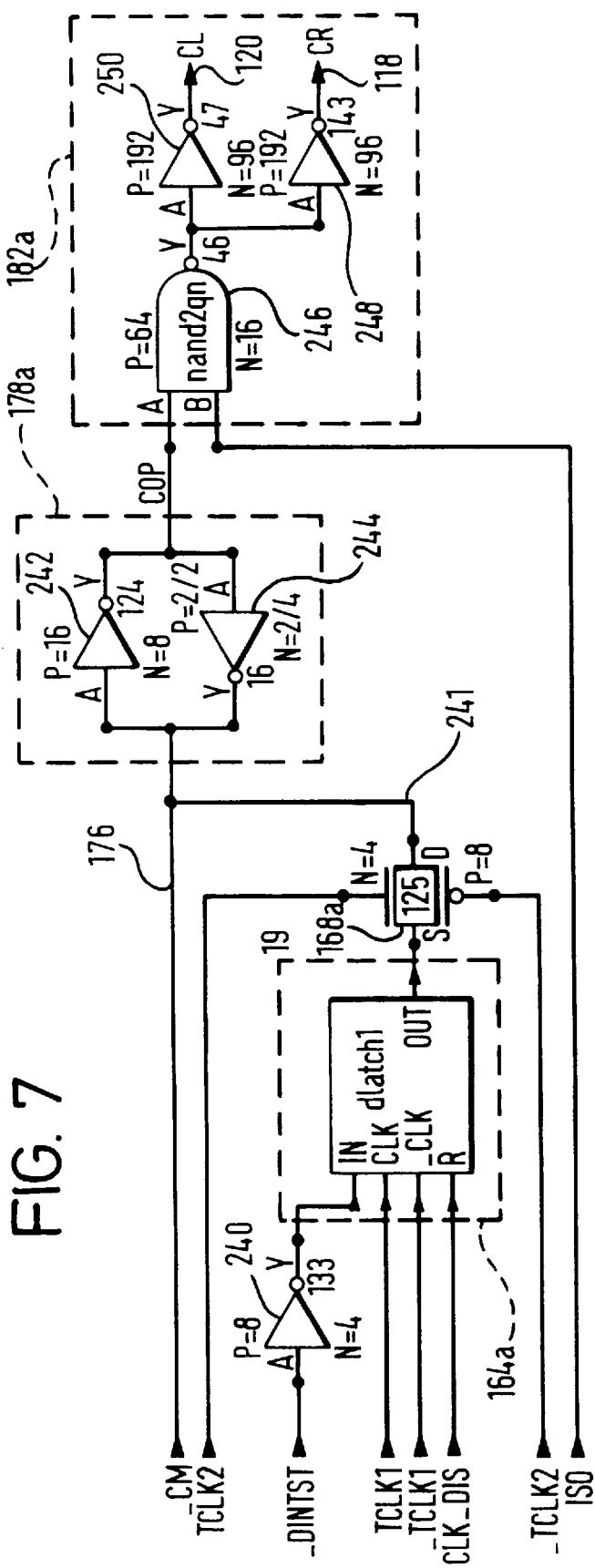
FIG. 7 is a circuit diagram of the control bus driver of FIG. 4.

FIG. 7 shows block 238 of FIG. 4 in more detail. One of the test data latches 164 is shown, referenced by the number 164a, and has four inputs. The first input IN receives the inverse of one bit i.e. one line of the data signal _DINTST via inverter 240. Data signal _DINTST is the test data input by the user via the input/output device 140 during a test mode and represents the codes that would have to be generated by the control circuitry 152 in normal operation. The second and third inputs CLK and $\overline{\text{CLK}}$ respectively are timing inputs and receive clock signals TCLK1 and $\overline{\text{TCLK1}}$ respectively. Finally, the fourth input R receives a reset signal CLK_DIS which resets the test data latch 164a in the event of a power failure to put the latch 164a into a predetermined logic state.

The output of latch 164a is input to test multiplexer 168a. Again only one line of the 8-bit path 170 between the test data latches 164 and the test multiplexer 168 is shown. The test multiplexer 168a has two further inputs from clock signals TCLK2 and $\overline{\text{TCLK2}}$. These clock signals determine whether or not the test multiplexer 168a is able to output the latched data to a respective latch 178a of the control bus latches 178. Thus in normal operation, the test multiplexer 168 would be disabled. The output 241 of test multiplexer 168a is input into latch 178a which comprises two inverters 242 and 244. The output Y of each inverter 242 and 244 is connected to the input A of the other inverter 244 and 242, respectively. The latch 178a can also receive an input 176 from control multiplexer 172 depending on whether the circuit 102 is in a test mode or operating normally. Only one line of the 8 bit path 174 between the test multiplexer 168 and the control bus latch 178 is shown. Likewise only one line of the 8 bit path 180 between the control bus latches 178 and control bus drivers 182 is shown. The suffix "a" is used to indicate that the referenced component forms a one bit part of the larger 8-bit component shown in FIG. 4.

The output of the control bus latch 178a is connected to a control bus driver 182a for one line. The control bus driver 182a comprises a NAND gate 246 and two inverters 248 and 250. Input A of the NAND gate 246 receives the output from control bus latch 178a. Input B of NAND gate 246 receives an isolation signal ISO. The signal ISO is used in certain test modes of the flash EPROM to effectively isolate the control buses 118 and 120 from the control bus drivers 182. It achieves this isolation by forcing all the values on the lines of the bus to zero. In this way, the control circuitry 152, itself can be tested without affecting the memory array.

The output Y of NAND gate 246 is input, in parallel, to the two inverters 248 and 250. The output of inverter 248 is connected to control bus 118 while the output of inverter 250 is connected to control bus 120 so that the same bus signal is driven in both directions around the chip.

To summarize, the test and normal modes of operation of the flash EPROM circuit 102 will now be briefly described. In normal operation, command data is input into the input/output device 140. The command data is input to the control circuitry 152 via the data in circuit 156. The control circuitry 152 acts as a state machine and generates, in response to the command data a sequence of codes or states for controlling respective peripheral circuits. The control circuitry 152 uses the clock signals CLK1 and $\overline{\text{CLK1}}$ provided by the clock control circuitry 184. The consecutive coded states are output via the control multiplexer 172, enabled by clock signals CLK2 and $\overline{\text{CLK2}}$ to the control bus latches 178. The control bus drivers 182 then drive the coded signals onto the control buses 118 and 120 which are driven in both directions around the chip. TCLK1 and $\overline{\text{TCLK1}}$ toggle in the same as CLK1 and $\overline{\text{CLK1}}$ so that any test data present is always sampled. However, because TCLK2 and $\overline{\text{TCLK2}}$ are inactive during normal operation, the test multiplexer 168 is disabled so that any test data is not passed to the control buses 118 and 120.

In a test mode, test data is input into the input/output pad 140. Thus, the normal external pins of the device can be used to provide the test signals and in particular the test data. This test data emulates control signals that would be generated by the control circuitry 152 in the normal operating mode of the device. The test data is input via the data in circuit 156 to the test data latches 164. These test data latches 164 are enabled by clock signals TCLK1 and $\overline{\text{TCLK1}}$ received from the clock control circuitry 184. Test data from the test data latches 164 is input via the test multiplexer 168 to the control bus latches 178. The test clock signals TCLK2 and $\overline{\text{TCLK2}}$ provided by the clock control circuitry 184, now enable the test multiplexer 168. At the same time, the control multiplexer 172 is disabled as clock signals CLK2 and $\overline{\text{CLK2}}$ are deactivated. The test data from the control bus latches 178 is driven onto the buses 118 and 120 by control bus drivers 182, as in the normal operating mode. It will be appreciated that the form of the clock signals TCLK2, $\overline{\text{TCLK2}}$ and CLK2 and $\overline{\text{CLK2}}$ determines whether the test and control multiplexers 168 and 172, respectively, are enabled or disabled. In turn, the form of these clock signals is determined by the level of the control bus test drive signal CBUS_DRV input to the clock control circuitry 184.

FIG. 8 will now be briefly described. This Figure shows the first and second complex gates 210 and 212 of FIG. 5 in more detail. The complex gates 210 and 212 have first, second and third p-channel MOSFETS 260, 262 and 264 respectively and first, second and third n-channel MOSFETs 266, 268 and 270 respectively. The first p-channel MOSFET 260 has its source s connected to a Vcc supply 261, its gate g connected to input B of the complex gate 210 or 212 and its drain d connected to the source s of the second p-channel MOSFET 262. The second p-channel MOSFET 262 has its gate g connected to input C of the complex gate 210 or 212 and its drain d connected to the drain d of the first n-channel MOSFET 266. The gate g of the first n-channel MOSFET 266 is connected to input A of the complex gate 210 or 212 while its source s is connected to the drain d of the second n-channel MOSFET 268. The second n-channel MOSFET 268 has its gate g connected to input B of the complex gate 210 or 212. The source s of this second n-channel MOSFET 268 is connected to a ground node 269.

The third p-channel MOSFET 264 has its source s connected to the Vcc supply 261 and its drain d is connected, as is that of the first p-channel MOSFET 260, to the source s of the second p-channel MOSFET 262. The gate g of the third p-channel MOSFET 264 is connected to input A of the complex gate 210 or 212. The third n-channel MOSFET 270 has its drain d connected to the drain d of the second p-channel MOSFET 262 as is drain d of the first n-channel MOSFET 266. The gate g of the third n-channel MOSFET 270 is connected to input C of the complex gate 210 or 212. Finally, the source s of that third n-channel MOSFET 270 is connected to the ground node 269. The output Y of the complex gate 210 or 212 is taken from node 274 which is between the drain d of the second p-channel MOSFET 262 and the drain d of the third n-channel MOSFET 270.

Each of the n-channel MOSFETS has a width to length ratio 8/0.8 while each of the p-channel MOSFETS has a width to length ratio of 8/0.9. The gate illustrated in FIG. 8 operates to provide the truth table of Table A.

The response of a peripheral circuit to a test signal can be verified in a number of ways such as through normal operational circuits, for example, the sense amplifiers, as well as by using any suitable test mode and its associated circuitry known to a person skilled in the art. Thus, the response of a circuit being tested to test data can be checked by seeing what if any, effect the peripheral circuit has for example, on the memory. Special test data outputs may not be required in that the same type of outputs which would be obtained in the normal mode of operation can be used in the test mode of operation to ascertain how a peripheral circuit has responded to test data.

The embodiment of the present invention described has been concerned with the testing of an integrated circuit device and it will be appreciated that testing can be carried out to find out which peripheral circuit is malfunctioning as well as to characterize peripheral circuits of the device i.e. how respective peripheral circuits respond to given control signals.

Embodiments of the present invention may be used by, for example, the manufacturer of the integrated circuit in question and may have applications in chip validation (making sure that the chip is fully functional), characterization (making sure that the chip performance meets specifications) and/or production testing. In particular, embodiments of the present invention may be applicable in chip development. For example, if a prototype chip is not functioning correctly, the control circuitry can be bypassed in the test mode and each peripheral circuit tested in turn. The test data can be selected so as to thoroughly test each peripheral circuit. In this way, it is possible to diagnose which circuits do not function correctly and which may require redesign. This may also allow malfunctions in the control circuitry to be detected. This can simplify chip development as the number of different prototype chips required can be minimized in that it is possible to test thoroughly a large number of circuits of the integrated circuit device.

It will be appreciated that while the embodiment of the present invention has been described in relation to a flash memory, the present invention is also applicable to other memory devices or in fact any other integrated circuit device. While various embodiments have been described in this application for illustrative purposes, the claims are not so limited. Rather, any equivalent method or device operating according to principles of the invention falls within the scope thereof.

What is claimed is:

1. An integrated circuit device, comprising:
    operational circuitry to carry out operations of the integrated circuit device, the integrated circuit device having an array of memory cells;
    at least one peripheral circuit connected to said operational circuitry for carrying out at least one function in respect of said operational circuitry;
    input means for permitting the input of command data in a normal mode of operation via a plurality of inputs and for permitting the input of test data in a test mode of operation via said plurality of inputs;
    control circuitry having an input to receive command data from said input means and arranged to generate, in response to said command data, control signals to control said at least one peripheral circuit in the normal mode of operation;
    a control bus comprising a plurality of lines, said plurality of lines being equal in number to said plurality of inputs, coupled between said control circuitry and the at least one peripheral circuit and arranged to carry said control signals from the control circuitry to the at least one peripheral circuit during the normal mode of operation; and
    test circuitry having an input arranged to receive test data from said input means and having an output coupled to said control bus so that in the test mode of operation said test data is supplied to said at least one peripheral circuit from said test circuitry via said control bus and returned from the at least one peripheral circuit without affecting the array.

2. A device as claimed in claim 1, wherein said test circuitry comprises storage circuitry arranged to store said test data.

3. A device as claimed in claim 2, wherein said storage circuitry comprises latch circuitry.

4. A device as claimed in claim 1, wherein said test data input to said test circuitry emulates said control signals generated by said control circuitry in response to said command data.

5. A device as claimed in claim 1, further comprising switching circuitry operable to selectively couple one of said control circuitry and said test circuitry to said control bus, whereby in the normal mode of operation only said control circuitry is coupled to said control bus and in the test mode of operation only the test circuitry is coupled to said control bus.

6. A device as claimed in claim 1, wherein the control circuitry comprises a clock signal source which generates clock signals for use in both the normal mode of operation and the test mode of operation of said device.

7. A device as claimed in claim 6, wherein said clock signal source has a user clock input and a test mode signal input which has a first form when the device is in the normal mode of operation and a second different form when the device is in the test mode of operation.

8. A device as claimed in claim 5, wherein said switching circuitry is controlled by clock signals generated by a clock signal source which generates clock signals for use in both the normal mode of operation and the test mode of operation of said device.

9. A device as claimed in claim 1, further comprising an input/output device, said command data and said test data being input via said input/output device.

10. A device as claimed in claim 1, wherein at least one of said command data and said test data is input in parallel at said input means.

11. A device as claimed in claim 1, wherein a response of said at least one peripheral circuit to said test data is ascertained by determining an effect of the at least one function carried out by said at least one peripheral circuit on said operational circuitry.

12. A device as claimed in claim 1, wherein said device is a memory device.

13. A device as claimed in claim 12, wherein said memory device is a flash memory.

14. A method of testing a peripheral circuit of an integrated circuit device having an array of memory cells, said peripheral circuit being connected to operational circuitry, said peripheral circuit also being coupled to control circuitry by a control bus comprising a plurality of lines, said control circuitry being operable, in response to command signals input via a plurality of inputs of said integrated circuit device, said plurality of inputs being equal in number to said plurality of lines to generate signals for activating said peripheral circuit in a normal mode of operation in which said peripheral circuit is operable to carry out a function in respect of said operational circuitry, the integrated circuit device further including test circuitry, said method comprising:

inputting a test mode signal to enable the test circuitry in a test mode of operation;

inputting test data via said plurality of inputs to said test circuitry; and driving said test data onto said control bus, to thereby apply the test data to the peripheral circuit to be tested in the test mode of operation, said control bus also carrying the signals for activating said peripheral circuit from the control circuitry to said peripheral circuit in the normal mode of operation, wherein test data outputs are returned from the peripheral circuit without affecting the array.

15. A memory device comprising:

an array of memory cells;

peripheral circuitry coupled to said array for carrying out memory array functions;

a control bus comprising a plurality of lines coupled to said peripheral circuitry;

control circuitry for inputting command data via a plurality of inputs and generating control signals to control said peripheral circuitry, said plurality of inputs being equal in number to said plurality of lines, said control circuitry outputting the control signals to said control bus which carries the control signals to said peripheral circuitry in a normal mode of operation; and test circuitry for inputting test data and outputting the test data to said control bus to be carried to test said peripheral circuitry in a test mode of operation, wherein test data outputs are returned from the peripheral circuitry without affecting the array.

16. The device of claim 15 further comprising switching circuitry to electrically couple said control circuitry to said control bus in the normal mode of operation and to electrically couple said test circuitry to said control bus in the test mode of operation.

17. The device of claim 16 wherein said switching circuitry comprises:

a first switch for electrically connecting said control circuitry to said control bus in response to a first signal; and a second switch for electrically connecting said test circuitry to said control bus in response to a second signal.

18. The device of claim 17 wherein said control circuitry comprises a clock generator for generating the first and second signals.

19. The device of claim 18 wherein said test circuitry comprises storage circuitry to store the test data in response to a third signal.

20. The device of claim 19 wherein said clock generator generates the third signal.

21. The device of claim 15 further comprising an input circuit for permitting the input of the command data in the normal mode of operation and the input of the test data in the test mode of operation, said input circuit being coupled to said control circuitry and to said test circuitry.

22. The device of claim 21 further comprising an input/output device for inputting the command data and the test data said input/output device being coupled to said input circuit.

23. The device of claim 15 wherein the test data emulates the control signals.

24. The device of claim 15 wherein the memory device comprises a Flash EPROM device.

25. The device of claim 18 wherein said clock generator inputs a fourth signal having a first form in the normal mode of operation and a second form in the test mode of operation.

26. A method for testing a memory device, the method comprising:

inputting command data into a plurality of inputs in a normal mode of operation;

providing the command data to control circuitry from the plurality of inputs;

generating control signals in the control circuitry in response to the command data;

driving the control signals onto a control bus comprising a plurality of lines of the memory device in the normal mode of operation such that the control signals are applied via the control bus to peripheral circuitry that carries out memory array functions, wherein the plurality of lines is equal in number to the plurality of inputs;

inputting a test mode signal into the control circuitry;

inputting test data into the plurality of inputs;

providing the test data to test circuitry from the plurality of inputs;

enabling a test mode of operation; and driving the test data onto the control bus such that the test data is applied via the control bus to the peripheral circuitry in the test mode of operation and returned from the peripheral circuitry without having passed through the control circuitry.

27. The method of claim 26 wherein said enabling a test mode of operation comprises electrically connecting the test circuitry to an input of a driver circuit for driving the test data onto the control bus.

28. The method of claim 26, further comprising disabling the normal mode of operation.

29. The method of claim 28 wherein disabling the normal mode of operation comprises electrically disconnecting control circuitry from an input of a driver circuit such that command signals are isolated from the control bus.

30. The method of claim 26, further comprising latching the test data in a latch circuit.

31. The method of claim 26 wherein inputting test data comprises emulating command signals.

32. The method of claim 26 wherein inputting test data into the input means comprises inputting test data via an input/output device.

33. The method of claim 26 wherein inputting test data comprises inputting test data that emulates the control signals into the input means.

34. A method of testing a peripheral circuit of an integrated circuit device having an array of memory cells, said peripheral circuit being connected to operational circuitry, said peripheral circuit also being coupled to control circuitry by a control bus comprising a plurality of lines, said control circuitry being operable, in response to command signals input via a plurality of inputs of said integrated circuit device, to generate signals for activating said peripheral circuit in a normal mode of operation in which said peripheral circuit is operable to carry out a function in respect of said operational circuitry, said plurality of lines being equal in number to said plurality of inputs, the integrated circuit device further including test circuitry, said method comprising:

inputting a test mode signal via said plurality of inputs to enable the test circuitry in a test mode of operation;

generating test data to emulate the signals for activating said peripheral circuit;

inputting the test data via said said plurality of inputs to said test circuitry; and driving said test data onto said control bus, to thereby apply the test data to the peripheral circuit to be tested in the test mode of operation, said control bus also carrying the signals for activating said peripheral circuit from the control circuitry to said peripheral circuit in the normal mode of operation, wherein test data outputs are returned from the peripheral circuit without having passed through the control circuitry.

35. A memory device comprising:

an array of memory cells;

peripheral circuitry coupled to said array for carrying out memory array functions;

a control bus comprising a plurality of lines coupled to said peripheral circuitry;

control circuitry for inputting, command data via a plurality of inputs and generating control signals to control said peripheral circuitry, said plurality of inputs being equal in number to said plurality of lines, said control circuitry outputting the control signals to said control bus which carries the control signals to said peripheral circuitry in a normal mode of operation; and test circuitry for inputting test data and outputting the test data to said control bus to be carried to test said peripheral circuitry in a test mode of operation, wherein test data outputs are returned from the peripheral circuitry without having passed through the control circuitry.

36. The device of claim 35, further comprising switching circuitry to electrically couple said control circuitry to said control bus in the normal mode of operation and to electrically couple said test circuitry to said control bus in the test mode of operation.

37. The device of claim 36 wherein said switching circuitry comprises:

a first switch to electrically connect said control circuitry to said control bus in response to a first signal; and a second switch to electrically connect said test circuitry to said control bus in response to a second signal.

38. The device of claim 37 wherein said control circuitry comprises a clock generator to generate the first and second signals.

39. The device of claim 38 wherein said test circuitry comprises storage circuitry to store the test data in response to a third signal.

40. The device of claim 39 wherein said clock generator generates the third signal.

41. The device of claim 35, further comprising an input circuit to permit the input of the command data in the normal mode of operation and the input of the test data in the test mode of operation, said input circuit being coupled to said control circuitry and to said test circuitry.

42. The device of claim 41, further comprising an input/output device to input the command data and the test data, said input/output device being coupled to said input circuit.

43. The device of claim 35 wherein the test data emulates the control signals.

44. The device of claim 35 wherein the memory device comprises a Flash EPROM device.

45. The device of claim 35 wherein said clock generator inputs a fourth signal having a first form in the normal mode of operation and a second form in the test mode of operation.

* * * * *